United States Patent [19]

Ebata et al.

[11] Patent Number: 4,952,665
[45] Date of Patent: Aug. 28, 1990

[54] PROCESS FOR PRODUCTION OF AROMATIC POLYETHERS WITH ALKALI METAL CARBONATE/BICARBONATE/FLUORIDE COCATALYST

[75] Inventors: Shuji Ebata; Yasushi Higuchi, both of Nigata, Japan

[73] Assignee: Mitsubishi Gas Chemical Company, Ltd., Tokyo, Japan

[21] Appl. No.: 234,793

[22] Filed: Aug. 22, 1988

[30] Foreign Application Priority Data

Sep. 4, 1987 [JP] Japan ................................ 62-220331

[51] Int. Cl.[5] ............................................. C08G 65/40
[52] U.S. Cl. .................................... 528/219; 528/125; 528/126; 528/128; 528/171; 528/174; 528/214
[58] Field of Search ............... 528/219, 125, 126, 128, 528/171, 174, 214

[56] References Cited

U.S. PATENT DOCUMENTS 3,941,748 3/1976 King ..................................... 260/47
4,113,699 9/1978 Rose et al. .......................... 528/126
4,638,044 1/1987 Kelsey ................................. 528/219

FOREIGN PATENT DOCUMENTS 0001879 5/1979 European Pat. Off. .
0182648 5/1986 European Pat. Off. .
0195448 9/1986 European Pat. Off. .

OTHER PUBLICATIONS

Journal of Polymer Science, vol. 24, No. 2, Feb. 1986, New York, pp. 287–300; J. L. Hedrick et al.: "Radiation Resistant Amorphous-all Aromatic Polyarylene Ether Sulfones: Synthesis, Characterization, and Mechanical Properties", *pp. 289–291.

Primary Examiner—Harold D. Anderson
Attorney, Agent, or Firm—Frishauf, Holtz, Goodman & Woodward

[57] ABSTRACT

An improved process for producing aromatic polyethers by condensation polymerizing aromatic dihydroxy compounds represented by the general formula: HO—Ar—OH and aromatic dichloro compounds represented by the general formula: Cl—Ar$^1$—Y—Ar$^2$—Cl, or condensation polymerizing monohydroxymonochloro aromatic compounds represented by the general formula: HO—Ar$^1$—Y—Ar$^2$—Cl (in the above formulae, Ar, Ar$^1$, Ar$^2$ are as defined in the specification) in the presence of alkali metal compounds comprising a combination of alkali metal carbonates comprising carbonate and/or hydrogencarbonate of an alkali metal, e.g., potassium, and alkali metal fluorides.

In accordance with the present process, high molecular weight aromatic polyethers can be efficiently produced from aromatic chloro compounds which are inexpensive and easily available.

31 Claims, No Drawings

PROCESS FOR PRODUCTION OF AROMATIC POLYETHERS WITH ALKALI METAL CARBONATE/BICARBONATE/FLUORIDE COCATALYST

BACKGROUND OF THE INVENTION

The present invention relates to an improved process for production of aromatic polyethers. More particularly, it is concerned with a process for industrially advantageously producing high molecular weight aromatic polyethers excellent in properties such as heat resistance, chemical resistance and mechanical strength by performing polymerization in the presence of compounds having a specified catalytic action for polymerization.

In recent years, aromatic polyethers comprising ether groups and phenylene groups linked together through various functional groups have been attracting attention as materials for molding in various field because they are excellent in properties such as heat resistance, chemical resistance and mechanical strength.

Processes for production of aromatic polyethers can be divided into two groups: the electrophilic aromatic substitution method and the nucleophilic aromatic substitution method.

In accordance with the former method, polymerization is carried out with the liberation of hydrogen halide by the Friedel-Crafts reaction in which a hydrogen linked to an aromatic ring is substituted with a cationic species derived from the corresponding acyl halide by the use of a Lewis acid catalyst such as aluminum chloride, boron trifluoride and hydrogen fluoride. This method, however, has disadvantages from an industrial standpoint because it needs more than a stoichiometric amount of Lewis acid having high corrosiveness.

On the other hand, in accordance with the latter method, polyethers are produced through halogen substitution using a phenoxide anion according to the process as represented by the following formula:

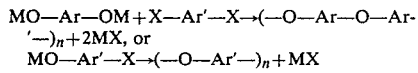

(wherein M is an alkali metal, X is a halogen atom, and Ar and Ar' are each a divalent aromatic radical which contains an electron withdrawing group such as a sulfonyl group or a carbonyl group which activates the halogen atom X).

As the above latter method, for example, a method in which a dialkali metal salt of an aromatic dihydroxy compound containing a carbonyl group and an aromatic dihalide compound (an aromatic dihalide) containing a carbonyl group or a sulfone group are heated at a temperature of 250° to 400° C. in diarylsulfone (see, for example, Japanese Patent Publication No. 22938/1982), and a method in which halophenol and alkali metal carbonate are heated at a temperature of 200° to 400° C. in a solvent (see, for example, Japanese Patent Application Laid-Open No. 5488/1986 and U.S. Pat. No. 4,113,699) are known.

R. N. Johnson et al., Journal of Polymer Science, Part A-1, Vol. 5, pp. 2375–2398 (1967) compared the reactivities of various activated aromatic dihalides with an alkali metal salt of bisphenol A in a dimethylsulfoxide solvent and concluded that aromatic fluorides are much more reactive than aromatic chlorides having the same structure and produce polyethers having a higher degree of polymerization.

Joseph F. Bunnett et al., Chemical Review, Vol. 49, pp. 274–412 (1951), particularly the review at page 333, and Jerry March, Advanced Organic Chemistry, 3rd ed., page 587 describe that the reactivity of halogen atom as a releasing group in the two molecular aromatic nucleophilic substitution reaction is generally in the following order:

which is in agreement with the results of R. N. Johnson et al.

Thus it can be seen from the above publications that in producing polyethers having a high degree of polymerization by the nucleophilic aromatic substitution method, an aromatic fluoro compound is desirable to use as the electrophilic monomer component rather than an aromatic chloride compound.

Particularly in a case where an aromatic halogeno compound does not contain a highly electron withdrawing group in the para- or ortho-position relative to the halogen atom, the halogen atom is activated only insufficiently and, therefore, the aromatic chloro compound is of low reactivity and cannot provide high molecular weight aromatic polyethers although it is of low cost as compared with the corresponding aromatic fluoro compound and thus is much more advantageous over the aromatic fluoro compound from an economic standpoint. Actually this is described also in Japanese Patent Publication No. 10486/1986.

The reactivity of the alkali metal salt of the aromatic hydroxy compound to be used as the nucleophilic monomer component is also significant. Industrially, the sodium or potassium salt is usually used Although the sodium salt is advantageous from an economic standpoint, the potassium salt is often chosen in that nucleophilic properties of phenoxide anion are excellent.

The above-cited publication, Advanced Organic Chemistry, 3rd ed., page 308 describes that the reactivity of an anionic nucleophile varies with alkali metal counter ion, and $K^+ > Na^+$. Particularly in the condensation polymerization with an aromatic halogen compound in which there is no highly electron withdrawing group in the para- or ortho-position relative to the halogen atom and thus the halogen atom is activated only insufficiently, no high molecular weight polymer can be obtained unless the potassium salt is used.

In order to overcome the above problems, Japanese Patent Application Laid-Open No. 221227/1986 discloses an improved method in which a halophenol or a mixture of an aromatic dihydroxy compound and an aromatic dihalide compound is subjected to condensation polymerization in the presence of a stoichiometric amount of sodium carbonate or sodium hydrogencarbonate and a small amount of the fluoride or chloride of potassium, rubidium or cesium to produce poly (aryletherketone). This method is intended to increase reactivity of phenoxide anion while using the sodium salt which is of low cost.

The above method, however, does not activate the electrophilic monomer component and, therefore, it is considered that the method is applicable only to aromatic fluoro compounds or aromatic chloro compounds in which the chlorine atom is highly activated by a highly electron withdrawing group existing at the para- or ortho-position relative to the chlorine atom for the aforementioned reasons. In other words, Japanese Patent Application Laid-Open No. 221227/1986 suggests that in the polycondensation between the substantially sodium salt of an aromatic dihydroxy compound as the nucleophilic monomer component and a highly reactive aromatic halide compound as the electrophilic monomer component, addition of the fluoride or chloride of an alkali metal having an atomic number exceeding that of sodium permits production of high molecular weight polymers.

In R. N. Johnson et al., Journal of Polymer Science, Vol. 5, Part A-1, pp. 2415-2427, especially at page 2424, it is described that in the polycondensation reaction of an alkali metal salt of bisphenol A and 4,4'-dichlorodiphenylsulfone in a dimethylsulfoxide solvent, even if anhydrous potassium fluoride is added, no change in viscosity of formed polymer is observed and the reason for this is that the rate of substitution of the chlorine atom with the fluoride ion in the reaction system is slow.

It is also known as described in Japanese Patent Application Laid-Open No. 179228/1986 that in production of aromatic polyethers from an aromatic halide monomer of low reactivity, addition of a copper compound accelerates the polymerization. The addition of a copper compound, however, is accompanied by undesirable phenomena such as incorporation of copper in the formed polymer and coloration, and furthermore, if an easily oxidizable monomer such as hydroquinone is used as the aromatic dihydroxy compound, the copper compound undergoes deterioration, thereby losing the polymerization acceleration effect.

SUMMARY OF THE INVENTION

An object of the present invention is to provide an improved process for producing high molecular weight aromatic polyethers which are excellent in properties such as heat resistance, chemical resistance and mechanical strength.

Another object of the present invention is to provide a process for industrially advantageously producing high molecular weight aromatic polyethers from aromatic chlorine compounds by the use of a specified alkali metal compound system.

The present invention relates to an improved process for producing aromatic polyethers which comprises condensation polymerizing aromatic dihydroxy compounds represented by the general formula:

HO—Ar—OH (I)

(wherein Ar is a divalent aromatic radical) and aromatic dichloro compounds represented by the general formula:

Cl—Ar$^1$—Y—Ar$^2$—Cl (II)

(wherein Ar$^1$ and Ar$^2$ are each a divalent aromatic radical, e.g., a phenylene group, a naphthylene group, a biphenylene group, or —Ph—Z—Ph— (wherein Ph is a phenylene group or a substituted phenylene group, and Z is a divalent hydrocarbon group, a divalent fluorinated hydrocarbon group, a carbonyl group, a sulfone group, a sulfoxide group, an oxygen atom or a sulfur atom), and Y is a carbonyl group, a sulfone group, a sulfoxide group, —CO—CO—, a divalent hydrocarbon group, a divalent fluorinated hydrocarbon group, an oxygen atom, a sulfur atom or a direct bond), or condensation polymerizing monohydroxymonochloro aromatic compounds represented by the general formula:

HO—Ar$^1$—Y—Ar$^2$—Cl (III)

(wherein Ar$^1$ and Ar$^2$ are the same as above) in the presence of a alkali metal compounds comprising a combination of at least one alkali metal carbonate of the carbonate and hydrogencarbonate of an alkali metal selected from potassium, rubidium and cesium (excluding lithium and sodium) and the fluoride of an alkali metal selected from sodium, potassium, rubidium and cesium.

DESCRIPTION OF PREFERRED EMBODIMENTS

Aromatic polyethers obtained by the process of the present invention include oligomers, polymers and superpolymers each containing a repeating unit of ethereal oxygen bonded by divalent aromatic groups, e.g., 1,4-phenylene.

Aromatic dihydroxy compounds to be used as the starting material in the process of the present invention are, as described above, divalent phenols represented by the general formula:

HO—Ar—OH (I)

(wherein Ar is a divalent aromatic radical). Ar represents various divalent aromatic radicals, e.g., a phenylene group, a naphthylene group, a biphenylene group, and —Ph—Z—Ph— (wherein Ph is a phenylene group or a substituted phenylene group, and Z is a divalent hydrocarbon group, a divalent fluorinated hydrocarbon group, a carbonyl group, a sulfone group, a sulfoxide group, an oxygen atom or a sulfur atom). Representative examples of the aromatic dihydroxy compounds are monocyclic phenols such as hydroquinone and the like; polycyclic phenols such as 2,6-dihydroxynaphthalene and the like; dihydroxypolyphenyl such as 4,4'-dihydroxybiphenyl and the like, bis(hydroxyphenyl) alkanes such as 2,2-bis (4-hydroxyphenyl)propane; 2,2-bis (4-hydroxyphenyl)-1,1,1,3,3,3-hexafluoropropane; bis(4-hydroxyphenyl)methane and the like; 4,4'-dihydroxybenzophenone; 4,4'-dihydroxydiphenyl ether; 4,4'-dihydroxydiphenyl sulfide; 4,4'-dihydroxydiphenyl sulfone; and their ring-substituted derivatives.

Of these aromatic dihydroxy compounds, hydroquinone, 4,4'-dihydroxybenzophenone and 4,4'-dihydroxybiphenyl are particularly preferred. The aromatic dihydroxy compounds can be used alone or as mixtures comprising two or more thereof.

Aromatic dichloro compounds to be condensed with the aromatic dihydroxy compounds are, as described above, chloro compounds represented by the general formula:

Cl—Ar$^1$—Y—Ar$^2$—Cl (II)

(wherein Ar$^1$ and Ar$^2$ are the same as above).

Suitable examples of the aromatic dichloro compounds are 4,4'-dichlorobenzophenone; 4,4'-dichlorobenzil; 3,3'-dichlorobenzophenone; 1,4-bis(4-chlorobenzoyl)benzene; 1,3-bis(4-chlorobenzoyl)benzene; 4,4'-bis(4-chlorobenzoyl) biphenyl; 4,4'-bis(4-chlorobenzoyl)diphenyl ether; 4,4'-bis (4-chlorobenzoyl)diphenyl sulfide; 4,4'-bis(chlorophenyl) benzophenone; 2-(4-chlorobenzoyl)-6-chloronaphthalene; 3,3'- dichlorodiphenyl sulfone; 4,4'-dichlorodiphenyl sulfone; 4,4'-dichlorodiphenyl sulfoxide; 4,4'-dichlorodiphenyl sulfide; 4,4'-dichlorodiphenyl ether; 4,4'-dichlorobiphenyl; 2,2-bis(4-chlorophenyl)hexafluoropropane and the like.

These aromatic dichloro compounds can be used alone or as mixtures comprising two or more thereof.

Of the aromatic dichloro compounds of the general formula (II), compounds containing a chlorine atom bonded at the para-position relative to the connecting group Y are particularly advantageously used to obtain polymers having a high melting point and high crystallinity. Particularly preferred is 4,4'-dichlorobenzophenone.

Monohydroxymonochloro aromatic compounds to be used as the starting material in the alternative process of the present invention are, as described above, compounds represented by the general formula:

HO—Ar$^1$—Y—Ar$^2$—Cl    (III)

(wherein Ar$^1$ and Ar$^2$ are the same as above). Representative examples of the monohydroxymonochloro aromatic compounds are 4-chloro-4'-hydroxybenzophenone; 4-(4-chlorobenzoyl)-4'-hydroxybiphenyl; 4-(4-chlorobenzoyl)-4'-hydroxydiphenyl ether; 4-(4-chlorobenzoyl)-4'-hydroxydiphenyl sulfide; 4-chloro-4'-hydroxydiphenyl sulfone; 4-chloro-4'-hydroxydiphenyl sulfoxide; 4-chloro-4'-hydroxydiphenyl sulfide; chloro-4'-hydroxydiphenyl ether; 4-chloro-4'-hydroxybiphenyl and the like. These monohydroxymonochloro aromatic compounds can be used alone or as mixtures comprising two or more thereof.

Of the above monohydroxymonochloro aromatic compounds, 4-chloro-4'-hydroxybenzophenone and 4-(4-chlorobenzoyl)-4'-hydroxydiphenyl ether are particularly preferred.

In accordance with the process of the present invention, aromatic dihydroxy compounds of the general formula (I) and aromatic dichloro compounds of the general formula (II) are condensation polymerized, or alternatively monohydroxymonochloro aromatic compounds of the general formula (III) are condensation polymerized. Further, a mixture of the compounds represented by the general formulae (I),(II) and (III) can be also condensation polymerized. In any case, condensation polymerization is carried out in the presence of alkali metal compounds comprising alkali metal (excluding lithium and sodium) carbonates and alkali metal fluorides.

The alkali metal fluorides as used herein are, for example, potassium fluoride, sodium fluoride, rubidium fluoride, and cesium fluoride These are desirable to be substantially anhydrous. Of these, potassium fluoride and sodium fluoride are particularly preferred.

The amount of the alkali metal fluoride used is determined so that the number of alkali metal atoms per replacable chlorine atom contained in the aromatic dichloro compound or monohydroxymonochloro aromatic compound is 5 or less, preferably 0.01 to 4 and particularly preferably 0.5 to 2.5.

In the process of the present invention, a combination of the above alkali metal fluorides and alkali metal carbonates is used. The alkali metal carbonates include the carbonates and hydrogencarbonates of alkali metals. These can be used alone or as mixtures comprising two or more thereof. The alkali metal carbonates must be the salts of potassium, rubidium and cesium, and excludes the salts of lithium and sodium. Of these, potassium salts are preferred. When the sodium salts are used, the sodium salt of aromatic dihydroxy compound represented by the general formula:

NaO—Ar—ONa (wherein Ar is the same as above) resulting from the reaction of the sodium salt and the aromatic dihydroxy compound of the general formula (I) does not have sufficiently high activity as the nucleophilic monomer component and, therefore, the condensation polymerization between the aromatic dihydroxy sodium salt compound and the aromatic dichloro compound of the general formula (II), which is of low reactivity as the electrophilic monomer component, does not proceed efficiently. In the case of the monohydroxymonochloro aromatic compound of the general formula (III), the sodium salt of monohydroxymonochloro aromatic compound represented by the general formula:

NaO—Ar$^1$—Y—Ar$^2$—Cl (wherein Ar$^1$ and Ar$^2$ are the same as above) is formed. Also in this case, the condensation polymerization does not proceed efficiently.

On the contrary, if the salts of potassium, rubidium and cesium, especially potassium are used as the alkali metal carbonates in combination with the alkali metal fluorides, the condensation polymerization unexpectedly proceeds very efficiently and the desired high molecular weight aromatic polyethers can be obtained.

The amount of the alkali metal carbonates used is determined so that the number of alkali metal atoms per phenolic hydroxy group contained in the aromatic dihydroxy compound or monohydroxymonochloro aromatic compound is about 1 to 1.2.

In accordance with the process of the present invention, condensation polymerization is usually carried out in a solvent. As the solvent for polymerization, dipolar aprotic solvents can be used. Diaryl sulfones are suitable in that they have a high boiling point and high heat stability, and are good solvents for the aromatic dihydroxy compounds as the starting material and the polymer products obtained. A typical example of the diaryl sulfones is diphenyl sulfone. The amount of the solvent used is not limited and usually chosen within the range that the weight ratio of the solvent to the total of the starting materials is 1:0.8 to 1:5.

In the process of the present invention, prescribed amounts of an aromatic dihydroxy compound, an aromatic dichloro compound, an alkali metal carbonate and an alkali metal fluoride are reacted in a given solvent by heating at 200° to 400° C.

It is desirable that the aromatic dihydroxy compound and the aromatic dichloro compound be mixed in a substantially equimolar amount, and that the excessive amount of one component be not more than 5 mol %.

In the process of the present invention, if necessary, monohydroxymonochloro aromatic compounds may be used in combination in the reaction of the aromatic dihydroxy compound with the aromatic dichloro compound. The amount of the mono hydroxymonochloro aromatic compound used should be chosen within the range that characteristics of the resulting polymer are not deteriorated. Usually it is chosen so that the molar ratio of the hydroxyl group of the nucleophilic monomer component to the chlorine atom of the electrophilic monomer component in the reaction system is within the range of 1:0.95 to 1:1.05.

In the embodiment of the present invention in which the monohydroxymonochloro aromatic compound is used as a starting monomer, a prescribed amount of a monohydroxymonochloro aromatic compound is reacted by heating in a given solvent in the presence of alkali metal fluoride and alkali metal carbonate.

In this case, if necessary, a suitable amount of an aromatic dihydroxy compound and/or an aromatic dichloro compound can be added as a molecular weight regulator or a starting material. In any case, it is desired to add in such an amount that the molar ratio of the hydroxy group of the nucleophilic monomer component to the chlorine atom of the electrophilic monomer component in the reaction system is within the range of 1:0.95 to 1:1.05.

In any embodiments of the process of the present invention, the desired polymer can be obtained by heating at a temperature of 200° to 400° C. for less than 24 hours. If the reaction temperature is less than 200° C., the degree of polymerization of the formed polymer is low. On the other hand, if it is more than 400° C., as well as coloration, undesirable side reactions such as gelation markedly occur.

It is desirable that the polymerization be carried out in an inert atmosphere, for example, in nitrogen or argon.

It is also possible that after prescribed amounts of an aromatic chloro compound component and an alkali metal fluoride are preliminarily reacted in a given solvent, a prescribed amount of an alkali metal carbonate and a prescribed amount of an aromatic dihydroxy compound when the aromatic chloro compound component is an aromatic dichloro compound, are added and the polymerization is continued at a temperature of 200° to 400° C. This preliminary reaction can be carried out at a temperature of 150° to 400° C., preferably 200° to 350° C.

For the purpose of controlling the degree of polymerization by neutralizing a reactive oxygen-containing anion or a reactive aromatic chlorine atom, a reagent for controlling the degree of polymerization can be incorporated in the reactor.

Particularly suitable for the above purpose are methyl chloride as the reactive monofunctional chlorinated compound, and 4,4'-dichlorobenzophenone, 4-chlorobenzophenone, 4,4'-dichlorophenyl sulfone and 4-chlorodiphenyl sulfone as the reactive aromatic chlorinated compounds.

After the completion of the polymerization, the reaction mixture is cooled and solidified along with the polymerization solvent, pulverized and then extracted alternately with a good solvent for the polymer, e.g., acetone, ethanol or methanol, and water, and rinsed to remove the polymerization solvent and inorganic salts, and finally dried to obtain the desired polymer.

The process of the present invention is distinguishable over the conventional methods in that in accordance with the process of the present invention in which the polymerization is carried out in the presence of alkali metal carbonates and specified alkali metal fluorides, even if aromatic chloro compounds which are originally of low reactivity are used as the starting material, high molecular weight polymers can be obtained.

Aromatic chloro compounds can be produced at much lower cost as compared with the corresponding aromatic fluoro compounds and, furthermore, alkali metal fluorides are available inexpensively. Thus the process of the present invention is economically advantageous over the conventional method using 4,4'-difluorobenzophenone and the like as the starting materials.

In accordance with the process of the present invention, aromatic chloro compounds in which the chlorine atom is activated only insufficiently can be used as the starting material and, therefore, a wide variety of compounds can be used as the electrophilic monomer component.

It is known that aromatic chloro compounds can be produced by various methods as compared with the other aromatic halogeno compounds, and further that the corresponding other halogen compounds are often difficult to synthesize. Thus the starting materials to be used in the process of the present invention are easily available.

As described above, the present invention extends the types of aromatic polyethers which can be produced on a commercial scale.

The alkali metal fluorides to be used in the present invention can be used repeatedly by recovering after the completion of the polymerization.

High molecular weight aromatic polyethers obtained by the process of the present invention are excellent in heat resistance, chemical resistance, mechanical strength and so forth, and thus can be used as construction materials, films, fibers, coating materials and so forth by themselves. Furthermore, they can be used as composite materials in admixture with reinforcing materials or fillers, e.g., glass fibers, carbon fibers, aramide fibers, calcium carbonate, and calcium silicate.

The present invention is described in greater detail with reference to the following examples and comparative examples.

EXAMPLE 1

5.2 g (0.02 mol) of 4,4'-dichlorobenzophenone, 2.20 g (0.02 mol) of hydroquinone, 2.02 g (0.048 mol) of sodium fluoride, 2.80 g (0.02 mol) of anhydrous potassium carbonate and 10.0 g of diphenyl sulfone were placed in a 100-milliliter four-necked flask equipped with a stirrer, a thermometer, a nitrogen introduction tube, and a water separator connected to an air condenser.

Evacuation of the reaction unit and replacement with high purity nitrogen by the use of a Firestone valve connected to the top of the condenser were repeated several times.

A high purity nitrogen stream was started to pass through the introduction tube and to be released through the top of the condenser. On heating the above mixture at 200° C. by the use of a mantle heater and a temperature controller while stirring, an almost colorless solution was obtained, and this solution was maintained for 1.5 hours in a nitrogen atmosphere.

The reaction mixture was heated to 250° C. and maintained at that temperature for 1 hour, and then heated to 330° C. and maintained at that temperature for 1 hour.

A very viscous reaction product was obtained, and this reaction product was cooled and solidified, and taken out of the flask. The solid mass thus obtained was ground so as to pass through a 16-mesh screen. The resulting powder was washed alternately each three times with 200 to 400 ml of hot acetone and hot water to remove diphenyl sulfone and inorganic salts.

The polymer obtained was vacuum dried at 140° C. to obtain 5.33 g (isolation yield 92.5%) of a cream-colored polymer.

The polymer was completely soluble in refluxed dichloroacetic acid, and the melting point as determined by a differential scanning calorimater (DSC) (temperature raising speed 20° C./min) was 333° C. The inherent viscosity as determined using a dichloroacetic acid solution (polymer concentration 1 g/dl) at 30° C. was 0.798 dl/g.

EXAMPLE 2

On repeating substantially the same procedure as in Example 1 using a smaller amount of sodium fluoride (0.024 mol, 1.01 g), 5.21 g (isolation yield 90.3%) of a cream-colored polymer was obtained.

The inherent viscosity as determined in dichloroacetic acid at 30° C. was 1.09 dl/g, and the melting point as determined by the use of DSC was 328° C.

EXAMPLE 3

On repeating substantially the same procedure as in Example 1 using a larger amount of sodium fluoride (0.096 mol, 4.04 g), 5.39 g (isolation yield 93.4%) of a cream-colored polymer was obtained.

The inherent viscosity as determined in dichloroacetic acid at 30° C. was 0.78 dl/g, and the melting point as determined by the use of DSC was 334° C.

EXAMPLE 4

The procedure of Example 1 was repeated with the exception that potassium fluoride (0.048 mol, 2.78 g) was used in place of sodium fluoride (0.048 mol), to obtain 5.28 g (isolation yield 91.5%) of a cream-colored polymer.

The inherent viscosity as determined in dichloroacetic acid at 30° C. was 0.787 dl/g, and the melting point as determined by the use of DSC was 337° C.

COMPARATIVE EXAMPLE 1

On repeating the procedure of Example 1 with the exception that sodium fluoride was not used, a brown polymer was obtained in a yield of 92.7% based on the weight of the monomers. The inherent viscosity as determined under the same conditions as in Example 1 was 0.457 dl/g, and it was found that the polymer had a low molecular weight. The melting point as determined by the use of DSC (temperature raising speed 20° C./min) was 325° C.

COMPARATIVE EXAMPLE 2

The procedure of Example 1 was repeated with the exception that sodium carbonate (0.02 mol, 2.12 g) was used in place of potassium carbonate (0.02 mol), and potassium fluoride (0.048 mol, 2.78 g) was used in place of sodium fluoride (0.048 mol), to obtain 5.33 g (isolation yield 92.5%) of a brown polymer.

The inherent viscosity as determined in dichloroacetic acid at 30° C. was 0.158 dl/g and it was found that the polymer had a low degree of polymerization. The melting point as determined by the use of DSC was 320° C.

COMPARATIVE EXAMPLE 3

On repeating the procedure of Example 1 with the exception that potassium carbonate was not used and a larger amount of sodium fluoride (0.08 mol, 3.36 g) was used, only a jellylike product was obtained in a low yield. The product was a greatly low molecular weight polymer. The glass reactor was corroded and white corrosion products were contained in the polymer.

EXAMPLE 5

The procedure of Example 1 was repeated with the exception that 4-chloro-4'-hydroxybenzophenone (0.04 mol, 9.31 g) was used in place of 4,4'-dichlorobenzophenone (0.02 mol) and hydroquinone (0.02 mol), to obtain 7.57 g (isolation yield 96.4%) of a cream-colored polymer.

The polymer was completely soluble in dichloroacetic acid. The inherent viscosity as determined in dichloroacetic acid at 30° C. was 1.23 dl/g, and the melting point as determined by the use of DSC was 359° C.

EXAMPLE 6

The procedure of Example 1 was repeated with the exception that 4-(4-chlorobenzoyl)-4'-hydroxydiphenyl ether (0.04 mol, 12.99 g) was used in place of 4,4'-dichlorobenzophenone (0.02 mol) and hydroquinone (0.02 mol), to obtain 11.21 g (isolation yield 97.3%) of a cream-colored polymer.

The polymer was completely soluble in dichloroacetic acid. The inherent viscosity as determined in dichloroacetic acid at 30° C. was 0.795 dl/g, and the melting point as determined by the use of DSC was 334° C.

EXAMPLE 7

The procedure of Example 1 was repeated with the exception that 4,4'-dichlorodiphenyl sulfone (0.02 mol, 5.74 g) was used in place of 4,4'-dichlorobenzophenone (0.02 mol), to obtain 5.85 g (isolation yield 90.2%) of a cream-colored polymer.

The polymer was completely soluble in dichloroacetic acid. The inherent viscosity as determined in dichloroacetic acid at 30° C. was 1.023 dl/g, and the melting point as determined by the use of DSC was 306° C.

EXAMPLE 8

The procedure of Example 1 was repeated with the exception that 2,2-bis (4-hydroxyphenyl)-1,1,1,3,3,3-hexafluoropropane (0.02 mol, 6.73g) was used in place of hydroquinone (0.02 mol), and that ethanol was used in place of acetone as the washing solvent, to obtain 9.57 g (isolation yield 93.0%) of a cream-colored polymer.

The polymer was completely soluble in dichloroacetic acid. The inherent viscosity as determined in dichloroacetic acid at 30° C. was 0.871 dl/g.

EXAMPLE 9

The procedure of Example 1 was repeated with the exception that 3,3'-dichlorobenzophenone (0.02 mol, 5.02 g) was used in place of 4,4'-dichlorobenzophenone (0.02 mol), to obtain 5.27 g (isolation yield 91.5%) of a cream-colored polymer.

The polymer was completely soluble in dichloroacetic acid, and the inherent viscosity as determined in dichloroacetic acid at 30° C. was 0.823 dl/g.

COMPARATIVE EXAMPLE 4

The procedure of Example 9 was repeated with the exception that sodium carbonate (0.02 mol, 2.12 g) was used in place of potassium carbonate (0.02 mol), and that potassium fluoride (0.048 mol, 2.78 g) was used in place of sodium fluoride (0.048 mol, 2.78 g), to obtain 4.90 g (isolation yield 85.0%) of a brown polymer.

The inherent viscosity as determined in dichloroacetic acid at 30° C. was 0.120 dl/g, and it was found that the polymer had a low degree of polymerization.

What is claimed is:

1. A process for producing aromatic polyether which comprises condensation polymerizing an aromatic dihydroxy compound represented by the general formula:

HO—Ar—OH wherein Ar is a divalent aromatic radical and an aromatic dichloro compound represented by the general formula:

Cl—Ar$^1$—Y—Ar$^2$—Cl wherein Ar$^1$ and Ar$^2$ are each a divalent aromatic radical, and Y is a carbonyl group, a sulfone group, a sulfoxide group, —CO—CO—, a divalent hydrocarbon group, a divalent fluorinated hydrocarbon group, an oxygen atom, or a sulfur atom or Y represents a direct bond, in the presence of alkali metal compounds comprising a combination of (i) at least one alkali metal carbonate which is the carbonate or the hydrogencarbonate of an alkali metal selected from the group consisting of potassium, rubidium and cesium, and (ii) a fluoride of an alkali metal selected from the group consisting of sodium, potassium, rubidium and cesium.

2. The process as claimed in claim 1 wherein the alkali metal carbonate is present in such an amount that the number of alkali metal atoms per phenolic hydroxy group of the aromatic dihydroxy compound or the monohydroxymonochloro aromatic compound is 1 to 1.2.

3. The process as claimed in claim 1 wherein the alkali metal fluoride is present in such an amount that the number of alkali metal atoms per replacable chlorine atom of the aromatic dichloro compound or the monohydroxymonochloro aromatic compound is 0.01 to 5.

4. The process as claimed in claim 1 wherein the alkali metal fluoride is present in such an amount that the number of alkali metal atoms per replacable chlorine atom of the aromatic dichloro compound or the monohydroxymonochloro aromatic compound is 0.5 to 2.5.

5. The process as claimed in claim 1 wherein the alkali metal compounds are a combination of (i) potassium carbonate and (ii) sodium fluoride.

6. The process as claimed in claim 1 wherein the alkali metal compounds are a combination of (i) potassium carbonate and (ii) potassium fluoride.

7. The process as claimed in claim 1 wherein the aromatic dihydroxy compound is at least one compound selected from the group consisting of monocyclic phenols; condensed polycyclic phenols; dihydroxypolyphenyls; bis(hydroxyphenyl)alkanes; 4,4'-dihydroxybenzophenones; 4,4'-dihydroxydiphenyl ether; 4,4'-dihydroxydiphenyl sulfide; 4,4'-dihydroxydiphenyl sulfone and their ring-substituted derivatives.

8. The process as claimed in claim 1 wherein the aromatic dihydroxy compound is at least one compound selected from the group consisting of hydroquinone; 4,4'-dihydroxybenzophenone and 4,4'-dihydroxybiphenyl.

9. The process as claimed in claim 1 wherein the aromatic dichloro compound is at least one compound selected from the group consisting of 4,4'-dichlorobenzophenone; 4,4'-dichlorobenzil; 3,3'-dichlorobenzophenone; 1,4'-bis(4-chlorobenzoyl)benzene; 1,3-bis(4-chlorobenzoyl)benzene; 4,4'-bis(4-chlorobenzoyl) biphenyl; 4,4'-bis(4-chlorobenzoyl)diphenyl ether; 4,4'-bis (4-chlorobenzoyl)diphenyl sulfide; 4,4'-bis(chlorophenyl) benzophenone; 2-(4-chlorobenzoyl)-6-chloronaphthalene; 3,3'-dichlorodiphenyl sulfone; 4,4'-dichlorodiphenyl sulfone; 4,4'-dichlorodiphenyl sulfoxide; 4,4'-dichlorobiphenyl sulfide; 4,4'-dichlorodiphenyl ether; 4,4'-dichlorophenyl and 2,2-bis(4-chlorophenyl)hexafluoropropane.

10. The process as claimed in claim 1 wherein the aromatic dichloro compound is at least one compound selected from the group consisting of 4,4'-dichlorobenzophenone; 4,4'-bis(4-chlorobenzoyl)biphenyl; 4,4'-bis(4-chlorobenzoyl)diphenyl ether and 4,4'-bis(4-chlorobenzoyl)diphenyl sulfide.

11. The process as claimed in claim 1 wherein said alkali metal carbonate is potassium carbonate.

12. The process as claimed in claim 2 wherein the alkali metal fluoride is used in such an amount that the number of alkali metal atoms per replaceable chlorine atom of the aromatic dichloro compound of the monohydroxymonochloro aromatic compound is 0.01 to 4.

13. The process as claimed in claim 12 wherein the alkali metal fluoride is used in such an amount that the number of alkali metal atoms per replaceable chlorine atom of the aromatic dichloro compound or the monohydroxymonochloro aromatic compound is 0.5 to 2.5.

14. The process as claimed in claim 13 wherein said alkali metal carbonate is potassium carbonate.

15. The process as claimed in claim 14 wherein an aromatic dihydroxy compound and an aromatic dichloro compound are polymerized and the aromatic dihydroxy compound is at least one compound selected from the group consisting of monocyclic phenols; condensed polycyclic phenols; dihydroxypolyphenyls; bis(-hydroxyphenyl)alkanes; 4,4'-dihydroxybenzophenones; 4,4'-dihydroxydiphenyl ether; 4,4'-dihydroxydiphenyl sulfide; 4,4'-dihydroxydiphenyl sulfone and their ring-substituted derivatives; and wherein the aromatic dichloro compound is at least one compound selected from the group consisting of 4,4'-dichlorobenzophenone; 4,4'-dichlorobenzil; 1,3-bis(4-chlorobenzoyl)benzene; 3,3'-dichlorobenzophenone; 1,4'-bis(4-chlorobenzoyl)benzene; 4,4'-bis(4-chlorobenzoyl) biphenyl; 4,4'-bis(4-chlorobenzoyl) diphenyl ether; 4,4'-bis(4-chlorobenzoyl)diphenyl sulfide; 4,4'-bis(chlorophenyl) benzophenone; 2-(4-chlorobenzoyl)-6-chloronaphthalene; 3,3'-dichlorodiphenyl sulfone; 4,4'-dichlorodiphenyl sulfone; 4,4'-dichlorodiphenyl sulfoxide; 4,4'-dichlorodiphenyl sulfide; 4,4'-dichlorodiphenyl ether; 4,4'-dichlorodiphenyl ether; 4,4'-dichlorodiphenyl and 2,2-bis(4-chlorophenyl) hexafluoropropane.

16. The process as claimed in claim 15 wherein the aromatic dihydroxy compound is at least one compound selected from the group consisting of hydroquinone; 4-4'-dihydroxybenzophenone and 4,4'-dihydroxybiphenyl; and wherein the aromatic dichloro compound is at least one compound selected from the group consisting of 4,4'-dichlorobenzophenone; 4,4'-bis(4-chlorobenzoyl)biphenyl; 4,4'-bis(4-chlorobenzoyl)diphenyl ether and 4,4'-bis(4-chlorobenzoyl)diphenyl sulfide.

17. The process as claimed in claim 15 wherein the alkali metal compounds are a combination of (i) potassium carbonate and (ii) sodium fluoride.

18. The process as claimed in claim 16 wherein the alkali metal compounds are a combination of (i) potassium carbonate and (ii) sodium fluoride.

19. The process as claimed in claim 15 wherein the alkali metal compounds are a combination of (i) potassium carbonate and (ii) potassium fluoride.

20. The process as claimed in claim 16 wherein the alkali metal compounds are a combination of (i) potassium carbonate and (ii) potassium fluoride.

21. The process as claimed in claim 14 wherein 4,4-dichlorobenzophenone is condensation polymerized with hydroquinone.

22. The process as claimed in claim 14 wherein 4,4-dichlorodiphenyl sulfone is condensation polymerized with hydroquinone.

23. The process as claimed in claim 14 wherein 4,4'-dichlorobenzophenone is condensation polymerized with 2,2-bis(4-hydroxyphenyl)-1,1,1,3,3,3-hexafluoropropane.

24. The process as claimed in claim 14 wherein 3,3'-dichlorobenzophenone is condensation polymerized with hydroquinone.

25. The process as claimed in claim 22 wherein the alkali metal compounds are a combination of (i) potassium carbonate and (ii) sodium fluoride.

26. The process as claimed in claim 23 wherein the alkali metal compounds are a combination of (i) potassium carbonate and (ii) sodium fluoride.

27. The process as claimed in claim 24 wherein the alkali metal compounds are a combination of (i) potassium carbonate and (ii) sodium fluoride.

28. The process as claimed in claim 21 wherein the alkali metal compounds are a combination of (i) potassium carbonate and (ii) potassium fluoride.

29. The process as claimed in claim 22 wherein the alkali metal compounds are a combination of (i) potassium carbonate and (ii) potassium fluoride.

30. The process as claimed in claim 23 wherein the alkali metal compounds are a combination of (i) potassium carbonate and (ii) potassium fluoride.

31. The process as claimed in claim 24 wherein the alkali metal compounds are a combination of (i) potassium carbonate and (ii) potassium fluoride.

* * * * *